US012793425B2

(12) United States Patent
Kim et al.

(10) Patent No.: US 12,793,425 B2
(45) Date of Patent: Nov. 10, 2026

(54) DEVICE FOR PROVIDING SPATIAL INFORMATION CONVERGENCE SOLUTION

(71) Applicant: Meissa Inc., Gangnam-gu (KR)

(72) Inventors: Na Hyun Kim, Gangnam-gu (KR); Dong Young Kim, Gangnam-gu (KR); Hyun Sun Park, Gangnam-gu (KR)

(73) Assignee: MEISSA INC., Seoul (KR)

( * ) Notice: Subject to any disclaimer, the term of this patent is extended or adjusted under 35 U.S.C. 154(b) by 171 days.

(21) Appl. No.: 18/974,048

(22) Filed: Dec. 9, 2024

(65) Prior Publication Data

US 2025/0299488 A1 Sep. 25, 2025

(30) Foreign Application Priority Data

Mar. 20, 2024 (KR) ........................ 10-2024-0038328

(51) Int. Cl.

*G06V 20/52* (2022.01)
*G06V 20/10* (2022.01)
*G06V 20/13* (2022.01)
*G06V 20/17* (2022.01)

(52) U.S. Cl.

CPC .............. *G06V 20/52* (2022.01); *G06V 20/13* (2022.01); *G06V 20/17* (2022.01); *G06V 20/176* (2022.01)

(58) Field of Classification Search

CPC ........ G06V 20/52; G06V 20/13; G06V 20/17; G06V 20/176

See application file for complete search history.

(56) References Cited

U.S. PATENT DOCUMENTS

2015/0310633 A1 10/2015 Nelan
2023/0386198 A1 11/2023 Lee

FOREIGN PATENT DOCUMENTS

JP 2000194833 A 7/2000
JP 2022510487 A 1/2022
JP 2023176173 A 12/2023
KR 101916374 B1 11/2018
KR 20200032776 A * 3/2020 ............. G06F 16/22
KR 102170748 B1 10/2020

(Continued)

OTHER PUBLICATIONS

Chen et al, Wildland Fire Detection and Monitoring Using a Drone-Collected RGB/IR Image Dataset, 2022, IEEE Access, vol. 10, pp. 121301-121317. (Year: 2022).*

(Continued)

*Primary Examiner* — Kathleen M Broughton
(74) *Attorney, Agent, or Firm* — Perilla Knox & Hildebrandt LLP; Thomas B. Hildebrandt

(57) ABSTRACT

A device for providing a spatial information convergence solution comprising: a data collection module configured to receive a plurality of spatial information data and user requirement data; a selection module configured to select needed data required for generating the requirement data from among the plurality of spatial information data; a fusion module configured to generate a spatial information convergence solution by fusing the needed data; and an output module configured to provide the spatial information convergence solution to a user terminal for the user, wherein the plurality of spatial information data include at least one of CCTV data, drone data, GPS data, satellite imagery data, and aerial data.

10 Claims, 14 Drawing Sheets

(56) References Cited

FOREIGN PATENT DOCUMENTS

| | | | |
|---|---|---|---|
| KR | 1020210084186 | A | 7/2021 |
| KR | 1020220066508 | A | 5/2022 |
| KR | 1020220133620 | A | 10/2022 |
| KR | 1020230008972 | A | 1/2023 |
| KR | 1020230156543 | A | 11/2023 |
| KR | 1020230164887 | A | 12/2023 |

OTHER PUBLICATIONS

Mukhiddinov et al, A Wildfire Smoke Detection System Using Unmanned Aerial Vehicle Images based on the Optimized YOLOv5, 2022, Sensors, 2022, 22, pp. 1-25. (Year: 2022).*

Kim et al, Forest Fire Smoke Detection Based on Deep Learning Approaches and Unmanned Aerial Vehicle Images, 2023, Sensors, 2023, 23, pp. 1-25. (Year: 2023).*

Decision to Grant for Japanese Application No. 2024-217176 mailed Apr. 3, 2026. (machine translation).

Notice of Reasons for Refusal for Japanese Application No. 2024-217176 mailed Feb. 3, 2026.

* cited by examiner

DEVICE FOR PROVIDING SPATIAL INFORMATION CONVERGENCE SOLUTION

CROSS-REFERENCE TO RELATED APPLICATION

This application claims priority under 35 U.S.C § 119 to Korean Patent Application No. 10-2024-0038328 filed on Mar. 20, 2024, in the Korean Intellectual Property Office, the entire contents of which are hereby incorporated by reference.

TECHNICAL FIELD

The present disclosure relates to a device for providing a spatial information convergence solution.

Specifically, the present disclosure pertains to a device for providing a spatial information convergence solution that can select appropriate sources of spatial information data based on the analysis required by the user and fuse the spatial information data from each selected source to provide a solution at the level requested by the user.

BACKGROUND

The information described in this section merely provides background information related to the present embodiment and does not constitute prior art.

Generally, spatial information data is used to observe, monitor, or inspect spaces such as buildings or natural environments. At this time, the most common spatial information data includes Closed-Circuit Television (CCTV), and with recent technological advancements, drones, satellite images, and aerial images are also utilized.

However, existing surveillance and management platforms have the disadvantage of relying on fragmented spatial information, thereby failing to integrate and utilize the advantages and disadvantages of each spatial information.

Specifically, each spatial information data has unique spatial information parameters (e.g., resolution, acquisition cost, coverage area, real-time capability), which result in distinct advantages and disadvantages for each type of data. However, technology that provides spatial information convergence solutions by integrating and utilizing these various spatial information data remains insufficient.

Accordingly, there is a significant need for technology capable of providing a spatial information convergence solution of a new dimension by integrating and utilizing the advantages and disadvantages of each spatial information data.

SUMMARY

The problem that the present disclosure aims to solve is to provide a device for providing a spatial information convergence solution that can select appropriate sources of spatial information data based on the analysis required by the user and fuse the spatial information data from each selected source to provide a solution at the level requested by the user.

Specifically, the problem to be solved by the present disclosure is to provide a device for providing a spatial information convergence solution that can select appropriate spatial information data according to the user's analysis requirements by integrating and utilizing the advantages and disadvantages associated with spatial information parameters of each spatial information data, thereby delivering a total spatial information solution of a new dimension by fusing the selected appropriate spatial information data.

According to some aspects of the disclosure, a device for providing a spatial information convergence solution comprises, a data collection module configured to receive a plurality of spatial information data and user requirement data, a selection module configured to select needed data required for generating the requirement data from among the plurality of spatial information data, a fusion module configured to generate a spatial information convergence solution by fusing the needed data, and an output module configured to provide the spatial information convergence solution to a user terminal for the user, wherein the plurality of spatial information data comprises at least one of CCTV data, drone data, GPS data, satellite imagery data, and aerial data.

According to some aspects, the satellite imagery data comprises first satellite imagery data captured by a low-orbit satellite and second satellite imagery data captured by a geostationary satellite.

According to some aspects, the requirement data comprises solution type information related to the type of solution to be provided and priority information related to the priority of spatial information parameters.

According to some aspects, the solution type information comprises any one of construction site hazard notifications, urban heatwave warning management, wildfire risk monitoring, and agricultural field condition monitoring.

According to some aspects, the spatial information parameters comprise at least one of resolution, acquisition cost, coverage area, and real-time capability, and the priority information comprises the user's selection of at least one of the plurality of spatial information parameters.

According to some aspects, when the solution type information is the construction site hazard notification, the selection module selects the CCTV data, drone data, and GPS data as the needed data, the fusion module determines a hazardous area within a predefined zone based on the drone data and generates a hazard notification as the spatial information convergence solution when a worker enters the hazardous area, based on the CCTV data and GPS data, and the output module provides the hazard notification to the user terminal corresponding to the worker.

According to some aspects, when the priority information is the acquisition cost, the selection module selects a second drone data as the needed data from among a first drone data captured with a first capture interval and the second drone data captured with a second capture interval longer than the first capture interval.

According to some aspects, when the solution type information is the urban heatwave warning management, the data collection module further receives weather data including temperature and humidity information, the selection module selects the satellite imagery data and GPS data as the needed data, the fusion module determines the perceived temperature at specific locations within a predefined area based on the weather data and satellite imagery data, and generates a heatwave notification to a pedestrian as the spatial information convergence solution based on the location-specific perceived temperature and the GPS data, and the output module provides the heatwave notification to the user terminal corresponding to the pedestrian, wherein the heatwave notification comprises at least one of a notification regarding anticipated heatwave zones and a notification regarding potential shelter areas.

According to some aspects, when the solution type information is the wildfire risk monitoring, the selection module selects the drone data and satellite imagery data as the needed data, the fusion module generates a wildfire parameter by inputting the drone data and satellite imagery data into a pre-trained wildfire management algorithm, and determines the generated wildfire parameter as the spatial information convergence solution, and the output module provides the wildfire parameter to the user terminal, wherein the wildfire parameter comprises at least one of wildfire-affected area and wildfire spread rate.

According to some aspects, when the solution type information is the agricultural field condition monitoring, the selection module selects the first satellite imagery data and the second satellite imagery data as the needed data, the fusion module determines a Normalized Difference Vegetation Index NDVI by combining the first satellite imagery data and the second satellite imagery data, and determines the determined Normalized Difference Vegetation Index NDVI as the spatial information convergence solution, and the output module provides the Normalized Difference Vegetation Index NDVI to the user terminal.

The objects of the present disclosure are not limited to those mentioned above; other objects and advantages not explicitly described here may be understood from the following description and will be more apparently understood through embodiments of the present disclosure. Additionally, it will be easily understood that the objects and advantages of the present disclosure can be realized by means and combinations thereof indicated in the claims.

The device for providing the spatial information convergence solution according to some embodiments of the present disclosure has the new effect of providing a solution at the level required by the user by selecting appropriate sources of spatial information data based on the user's requested analysis and fusing the spatial information data from each selected source.

Specifically, the device for providing the spatial information convergence solution according to some embodiments of the present disclosure can provide a total spatial information solution of a new dimension by integrating and utilizing the advantages and disadvantages associated with spatial information parameters of each spatial information data, selecting appropriate spatial information data according to the user's analysis requirements, and fusing them.

In other words, each spatial information data has unique spatial information parameters (e.g., resolution, acquisition cost, coverage area, real-time capability), resulting in distinct advantages and disadvantages for each spatial information data. The device for providing the spatial information convergence solution according to some embodiments of the present disclosure ensures both the fulfillment of the user's requirements and the completeness of the solution by integrating and utilizing the advantages and disadvantages of each of spatial information data.

In addition to the content described above, the specific effects of some embodiments of the present disclosure are further described below while explaining the details necessary for carrying out the invention.

DETAILED DESCRIPTION OF THE PREFERRED EMBODIMENTS

Figure 1:
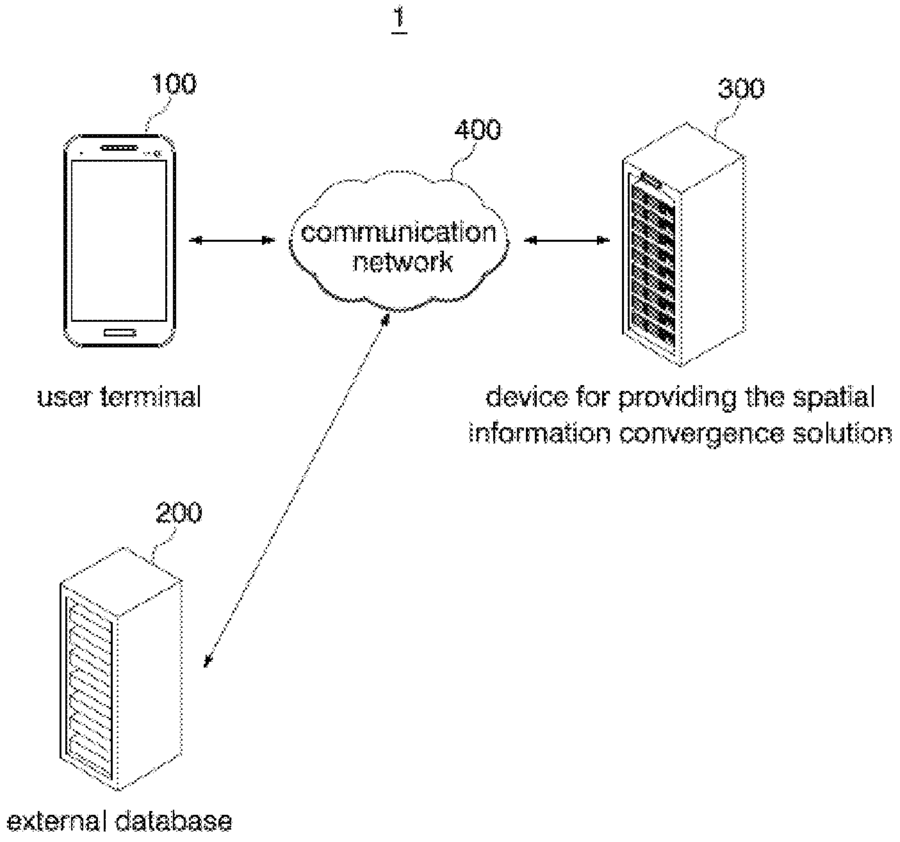
FIG. 1 illustrates a system for providing a spatial information convergence solution according to some embodiments of the present disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, the device for providing the spatial information convergence solution according to some embodiments of the present disclosure will be described with reference to FIGS. 1 to 8B.

FIG. 1 illustrates a system for providing a spatial information convergence solution according to some embodiments of the present disclosure.

Referring to FIG. 1, the system for providing the spatial information convergence solution 1 according to some embodiments of the present disclosure may include a user terminal 100, an external database 200, a device for providing the spatial information convergence solution 300 (hereinafter referred to as "the device"), and a communication network 400.

The user terminal 100 is a terminal related to the user requesting the spatial information convergence solution from the device 300.

In some examples, the user terminal 100 may transmit requirement data to the device 300. In other words, the user terminal 100 may transmit the requirement data, which is data requesting the spatial information convergence solution, to the device 300.

At this time, the requirement data may include solution type information and priority information. However, the embodiments of the present disclosure are not limited thereto, and the priority information may be omitted from the requirement data.

The solution type information may be information related to the type of solution the user wishes to receive. For example, the solution type information may include construction site hazard notifications, urban heatwave warning management, wildfire risk monitoring, agricultural field condition monitoring, and the like. In other words, the solution type information may include the user's selection of any one of construction site hazard notifications, urban heatwave warning management, wildfire risk monitoring, or agricultural field condition monitoring. However, the embodiments of the present disclosure are not limited to these examples.

The priority information may include information related to the priority of a plurality of spatial information parameters for spatial information data. In this case, the spatial information parameters may include resolution, acquisition cost, coverage area, real-time capability, and the like. In other words, the priority information may include the user's selection of spatial information parameters to prioritize among the plurality of spatial information parameters. Specifically, the priority information may include the user's selection of at least one of resolution, acquisition cost, coverage area, and real-time capability. However, the embodiments of the present disclosure are not limited to these examples, and variations in the spatial information parameter examples may be freely implemented.

Meanwhile, the user terminal 100 may take various forms of electronic devices such as a smartphone, computer, laptop PC, and wearable device; and workstation, data center, internet data center (IDC), direct attached storage (DAS) system, storage area network (SAN) system, network attached storage (NAS) system, and redundant array of inexpensive disks (RAID) system, but the embodiments of the present disclosure are not limited thereto.

The external database 200 may be a database that stores, manages, and/or transmits a plurality of spatial information data that serve as the basis for providing the spatial information convergence solution.

In some examples, the spatial information data may include CCTV data, drone data, GPS data, satellite imagery data, and aerial data. However, the embodiments of the present disclosure are not limited to these examples.

CCTV data may include images, videos, and other data captured by CCTVs installed in locations such as buildings and roads.

Drone data may include images, videos, and other data captured by cameras mounted on drones. In this case, drones may include ground drones, aerial drones, and underwater drones, but it is understood that the types of drones are not limited to these examples.

GPS data may include data collected via the Global Positioning System (GPS). The GPS system may be a system that provides location information of GPS receivers by receiving signals from satellites. For example, GPS data may include information on the current location of each user terminal 100; however, the embodiments of the present disclosure are not limited thereto.

Satellite imagery data may include data captured by satellites located at a predetermined altitude above the Earth's surface. In this case, satellites may include geostationary satellites located in relatively high orbits and low-orbit satellites located in relatively low orbits. In other words, satellite imagery data may include first satellite imagery data captured by geostationary satellites and second satellite imagery data captured by low-orbit satellites. The types of satellite imagery data may include visible light images, multispectral images, and so on.

Aerial data may include images, videos, and other data captured by cameras mounted on aircraft flying at a predetermined altitude (e.g., 2000 m to 4000 m) above the Earth's surface. In this case, the camera mounted on the aircraft may include a digital camera for aerial photography; however, the embodiments of the present disclosure are not limited to this example.

Meanwhile, the external database 200 may take various forms of electronic devices such as a computer, laptop PC, mobile device, and wearable device; and workstation, data center, internet data center (IDC), direct attached storage (DAS) system, storage area network (SAN) system, network attached storage (NAS) system, and redundant array of inexpensive disks or redundant array of independent disks (RAID) system, but the embodiments of the present disclosure are not limited thereto.

The device 300 may generate a spatial information convergence solution based on the spatial information data and requirement data and provide the generated spatial information convergence solution to the user terminal 100.

In some examples, the device 300 may select needed data required for generating the requirement data from among the plurality of spatial information data and then fuse the selected needed data to generate the spatial information convergence solution. The specific process by which the device 300 generates the spatial information convergence solution will be described later.

For example, the device 300 may take the form of a workstation, data center, internet data center (IDC), direct attached storage (DAS) system, storage area network (SAN) system, network attached storage (NAS) system, and redundant array of inexpensive disks, or redundant array of independent disks (RAID) system; however, the embodiments of the present disclosure are not limited thereto.

Meanwhile, the communication network 400 functions to connect the user terminal 100 and the external database 200 with the device 300. In other words, the communication network 400 refers to a network that provides a connection path so that the device 300 may transmit and receive data to and from the user terminal 100 and the external database 200. The communication network 400 may encompass wired networks such as Local Area Networks (LANs), Wide Area Networks (WANs), Metropolitan Area Networks (MANs), and Integrated Service Digital Networks (ISDNs), as well as wireless networks including wireless LANs, CDMA, Bluetooth, and satellite communication; however, the scope of the present disclosure is not limited thereto.

Hereinafter, the operation of the device 300 will be described in more detail with reference to FIG. 2.

Figure 2:
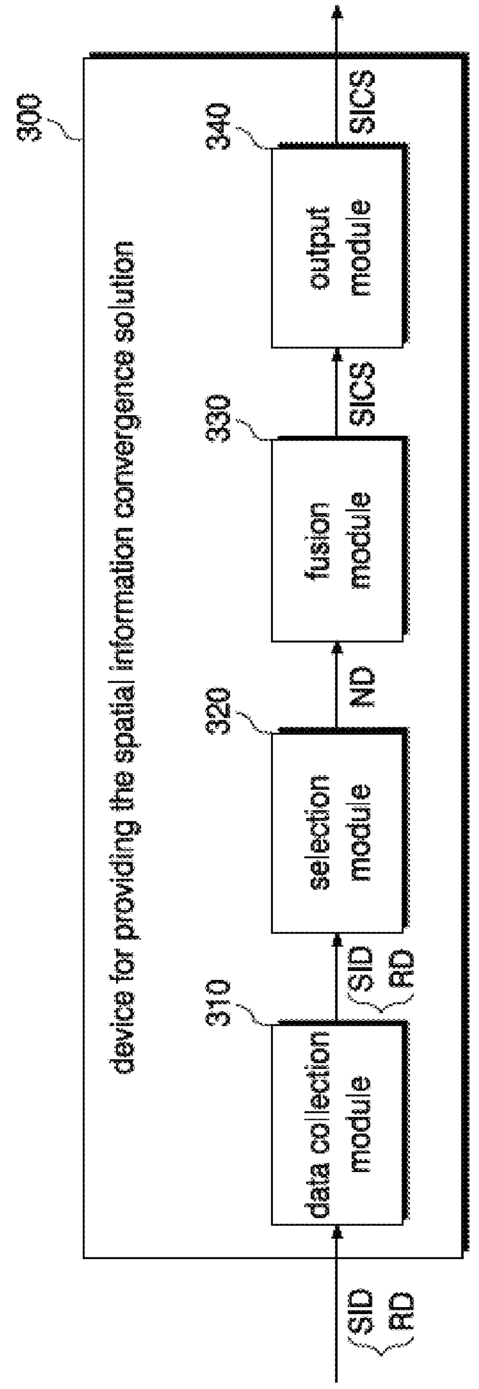
FIG. 2 is a block diagram of a device for providing a spatial information convergence solution according to some embodiments of the present disclosure.

FIG. 2 is a block diagram of a device for providing a spatial information convergence solution according to some embodiments of the present disclosure.

Referring to FIGS. 1 and 2, the device 300 is a device that provides a spatial information convergence solution (hereinafter referred to as "SICS") based on spatial information data (hereinafter referred to as "SID") and requirement data (hereinafter referred to as "RD"). Specifically, the device 300 may include a data collection module 310, a selection module 320, a fusion module 330, and an output module 340. However, the embodiments of the present disclosure are not limited thereto, and according to some embodiments, certain configurations may be implemented with some configurations omitted or with the addition of other configurations not shown.

The data collection module 310 may receive spatial information data SID and requirement data RD. In other words, the data collection module 310 may receive requirement data RD from the user terminal 100 and spatial information data SID from the external database 200. However, the embodiments of the present disclosure are not limited thereto; the spatial information data SID may also be pre-stored in a database module within the device 300. For convenience of explanation, the following description assumes that the data collection module 310 receives the spatial information data SID from the external database 200.

The spatial information data SID may refer to data collected for a specific point or area based on the geographic location (e.g., altitude, angle) of the data collection entities (e.g., CCTV, drones, satellites, aircraft). In some examples, the spatial information data SID may include CCTV data, drone data, GPS data, satellite imagery data, and aerial data. However, the embodiments of the present disclosure are not limited to these examples.

The requirement data RD may include solution type information and priority information. However, the embodiments of the present disclosure are not limited thereto, and the priority information may be omitted from the requirement data RD. The solution type information may be information related to the type of solution that the user wishes to receive. The priority information may include information related to the priority of the plurality of spatial information parameters corresponding to the spatial information data SID.

Hereinafter, the spatial information data SID according to some embodiments of the present disclosure will be described with reference to FIGS. 3A to 3C, and the requirement data RD according to some embodiments of the present disclosure will be described with reference to FIG. 4.

Figure 3A:
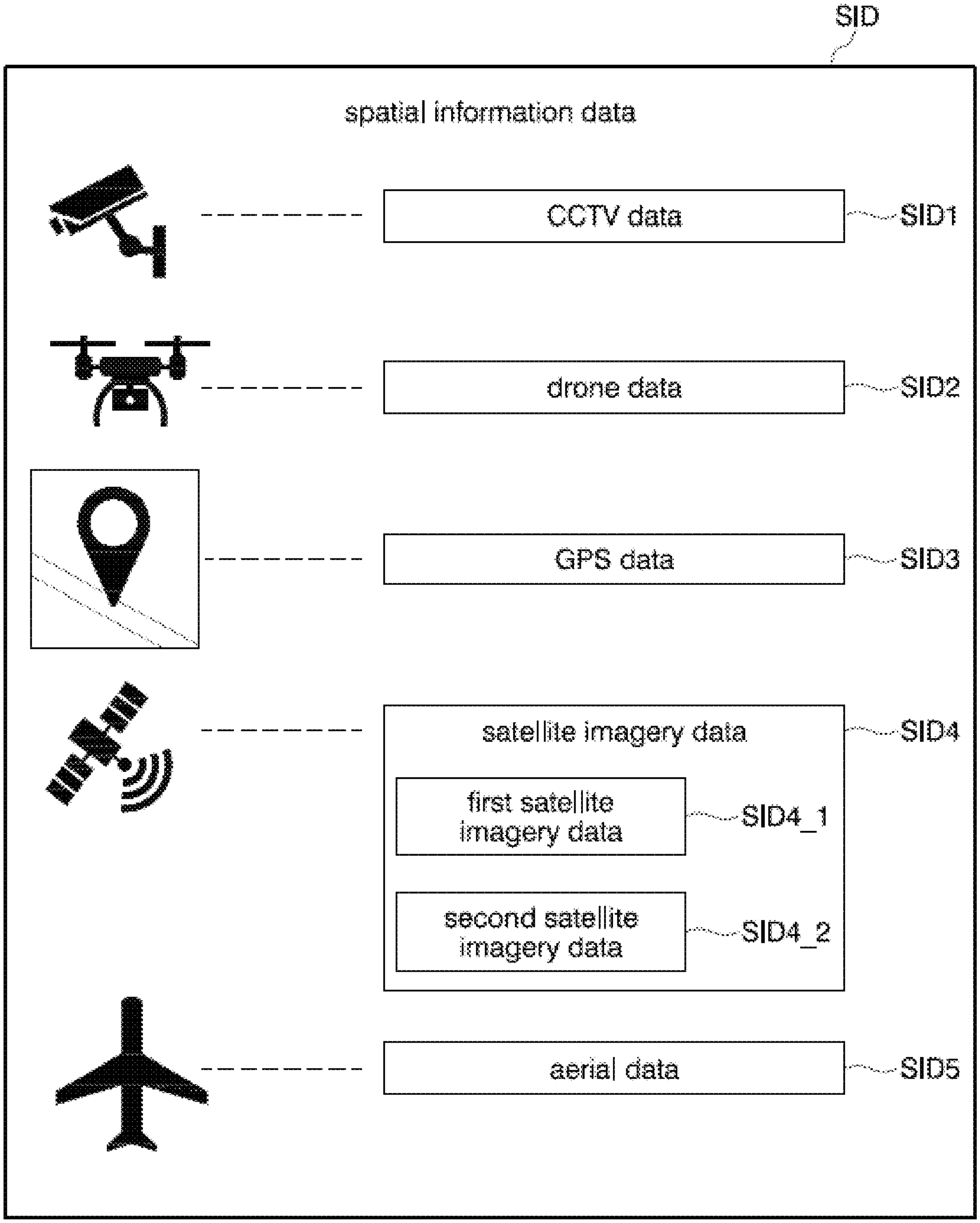
FIG. 3A is a diagram for illustrating examples of spatial information data.
Figure 3B:
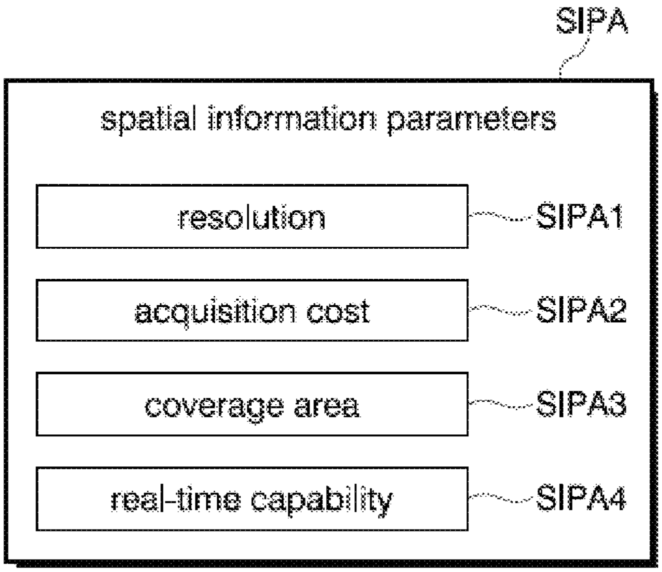
FIG. 3B is a diagram for illustrating examples of spatial information parameters.
Figure 3C:
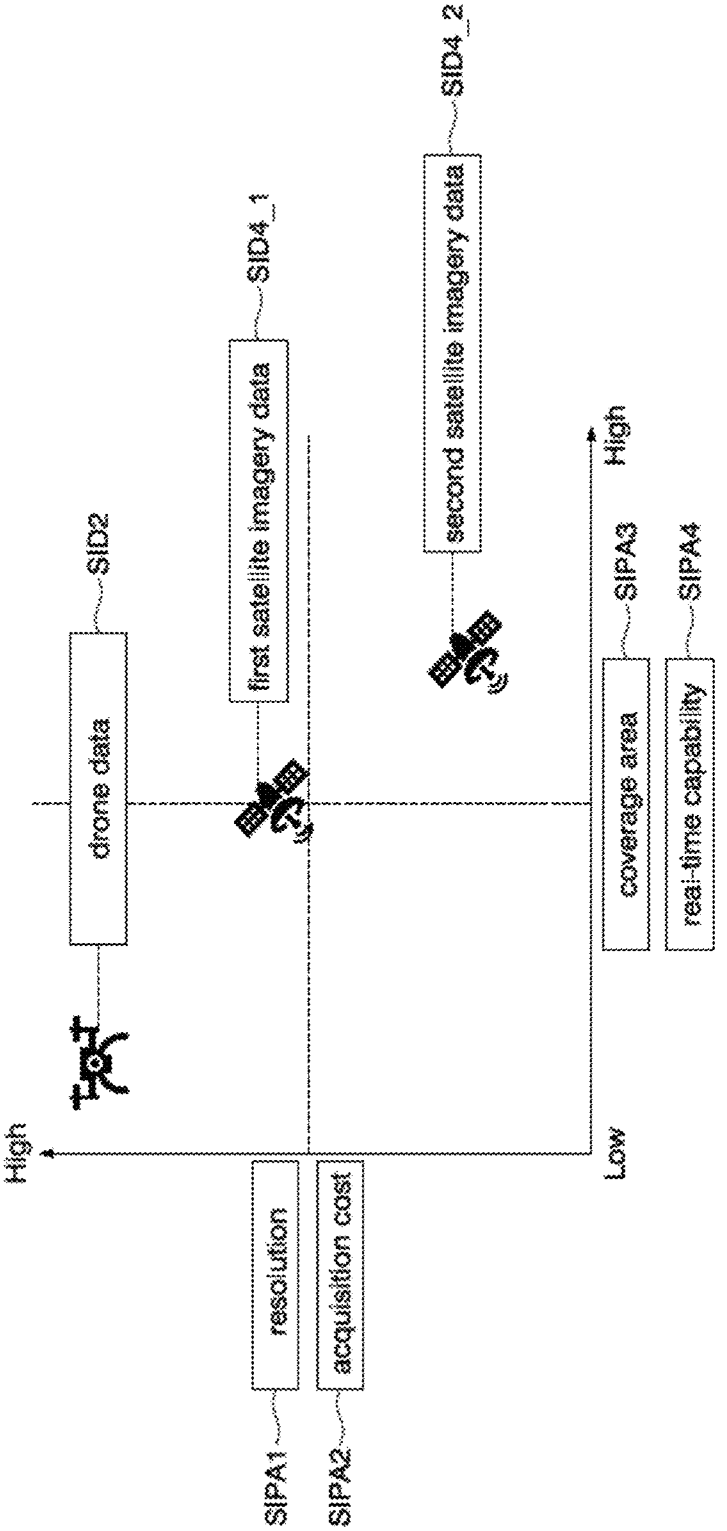
FIG. 3C is a diagram for exemplarily illustrating the relationship between spatial information data and spatial information parameters.

FIGS. 3A to 3C are diagrams for explaining the spatial information data according to some embodiments of the present disclosure. Specifically, FIG. 3A is a diagram for illustrating examples of spatial information data, FIG. 3B is a diagram for illustrating examples of spatial information parameters, and FIG. 3C is a diagram for exemplarily illustrating the relationship between spatial information data and spatial information parameters.

Referring to FIGS. 3A to 3C, the spatial information data SID may include CCTV data SID1, drone data SID2, GPS data SID3, satellite imagery data SID4, and aerial data SID5. However, the embodiments of the present disclosure are not limited thereto, and it is understood that the spatial information data SID may include additional types.

CCTV data SID1 may include images, videos, and other data captured by CCTVs installed on buildings, roads, and other locations. In other words, CCTV data SID1 may contain visual information monitored and recorded by CCTVs installed on specific buildings, roads, and other areas.

Drone data SID2 may include images, videos, and other data captured by cameras mounted on drones. In this case, drones may include ground drones, aerial drones, underwater drones, and so on; however, the types of drones are not limited thereto. Additionally, the navigation control of the drones that collect drone data SID2 may be performed by the device 300 (in FIGS. 1 and 2) itself or by its administrator.

GPS data SID3 may include data collected via the GPS system. The GPS system may be a system that provides information about the location of GPS receivers by receiving signals from satellites. In other words, GPS data SID3 may include data representing the geographic location of each device, collected through GPS satellite signals. For example, GPS data SID3 may include information about the current location of each user terminal 100 in FIG. 1; however, the embodiments of the present disclosure are not limited thereto. In this case, GPS data SID3 may be defined separately rather than being classified as spatial information data SID.

Satellite imagery data SID4 may include data captured by satellites positioned at a predetermined altitude above the Earth's surface. In this case, satellites may include geostationary satellites located in relatively high orbits and low-orbit satellites located in relatively low orbits. In other words, satellite imagery data SID4 may include a first satellite imagery data SID4_1 captured by geostationary satellites, second satellite imagery data SID4_2 captured by low-orbit satellites, and the like. The types of satellite imagery data SID4 may include visible light images, multispectral images, radar images, and others.

Aerial data SID5 may include images, videos, and other data captured by cameras mounted on aircraft flying at a predetermined altitude (e.g., 2,000 m to 4,000 m) above the Earth's surface. In this case, the camera mounted on the aircraft may include a digital camera for aerial photography; however, the embodiments of the present disclosure are not limited thereto.

Each of the plurality of spatial information data, SID1 through SID5, may have spatial information parameters, hereinafter referred to as SIPA. In other words, each of CCTV data SID1, drone data SID2, GPS data SID3, satellite imagery data SID4, and aerial data SID5 may have unique values for spatial information parameters SIPA.

In this case, spatial information parameters SIPA may refer to data characteristics corresponding to each type of spatial information data, SID1 through SID5. In other words, spatial information parameters SIPA may include indicators that quantify the attributes of each spatial information data, SID1 through SID5.

Referring to FIGS. 3B and 3C by way of example, in some cases, spatial information parameters SIPA may include resolution SIPA1, acquisition cost SIPA2, coverage area SIPA3, and real-time capability SIPA4. However, the embodiments of the present disclosure are not limited to these examples, and it is understood that spatial information parameters SIPA may include additional types of examples.

Resolution SIPA1 may refer to the minimum size of an object observed in the spatial information data SID or the minimum spatial distance that may be distinguished within the spatial information data SID. The higher the resolution SIPA1, the greater the ability to identify smaller objects or details.

Acquisition cost SIPA2 may refer to the cost incurred in acquiring the corresponding spatial information data SID. In this case, acquisition cost SIPA2 may encompass all costs related to the purchase, operation, and maintenance of data collection entities (e.g., CCTV, drones, satellites) as well as costs incurred during the acquisition process of the corresponding spatial information data SID. The greater the acquisition cost SIPA2, the higher the cost associated with utilizing the corresponding spatial information data SID.

Coverage area SIPA3 may refer to the geographic range or area that the spatial information data SID may cover. The larger the coverage area SIPA3, the wider the area that the corresponding spatial information data SID may cover.

Real-time capability SIPA4 may refer to the time it takes for the spatial information data SID to be collected and provided to the user terminal 100 in FIG. 1. The higher the real-time capability SIPA4, the less delay experienced in providing data to the user terminal 100.

As exemplified in FIG. 3C, the spatial information parameters SIPA of the spatial information data SID may be quantified in advance within a general range. For example, drone data SID2 obtained by drones typically has relatively high resolution SIPA1 and acquisition cost SIPA2 but lower coverage area SIPA3 and real-time capability SIPA4. In contrast, first satellite imagery data SID4_1 obtained by low-orbit satellites tends to have relatively average values for resolution SIPA1, acquisition cost SIPA2, coverage area SIPA3, and real-time capability SIPA4. Additionally, second satellite imagery data SID4_2 obtained by geostationary satellites has relatively lower resolution SIPA1 and acquisition cost SIPA2 but higher coverage area SIPA3 and real-time capability SIPA4.

The device 300 in FIGS. 1 and 2 of the present disclosure provides a spatial information convergence solution SICS by considering the characteristics of spatial information parameters SIPA for each of spatial information data, SID1 through SID5. This enables the device to select appropriate sources of spatial information data SID according to the analysis required by the user and to fuse the spatial information data SID from each selected source, thereby achieving the new effect of providing a solution at the level requested by the user. Specifically, the device 300 in FIGS. 1 and 2 of the present disclosure may provide a total spatial information solution of a new dimension by integrating and utilizing the advantages and disadvantages associated with spatial information parameters SIPA of each spatial information data SID, selecting appropriate spatial information data SID according to the user's analysis requirements, and fusing them. In other words, each spatial information data SID has unique spatial information parameters SIPA, resulting in distinct advantages and disadvantages for each type of data. By integrating and utilizing these advantages and disadvantages, the device 300 of the present disclosure ensures both the fulfillment of the user's requirements and the completeness of the solution.

Figure 4:
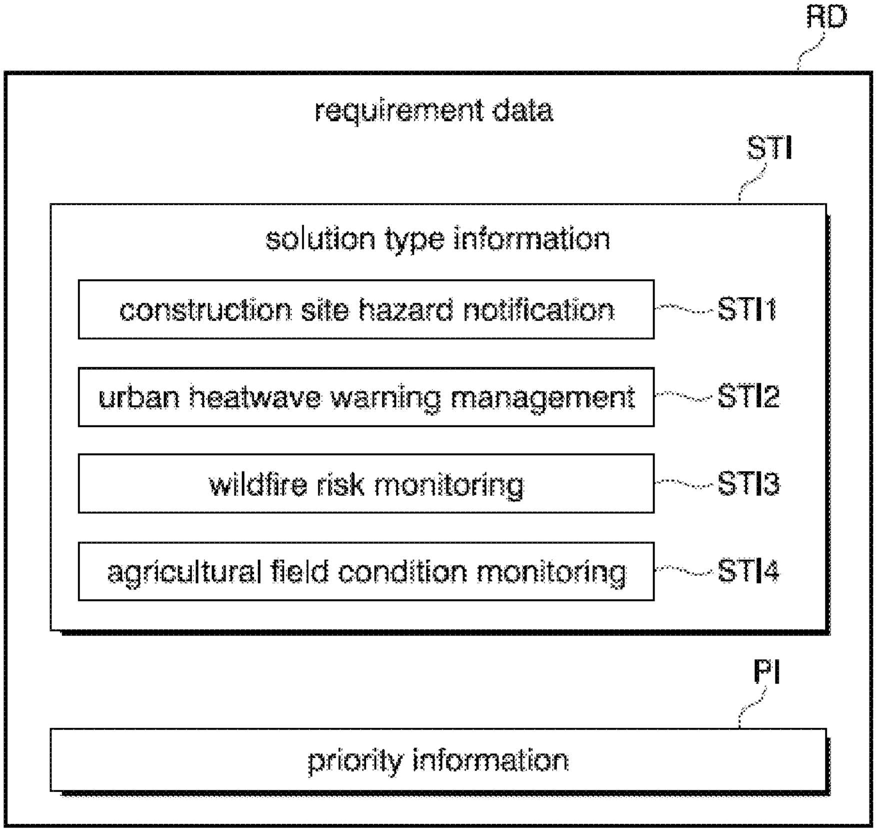
FIG. 4 is a diagram for explaining requirement data according to some embodiments of the present disclosure.

FIG. 4 is a diagram for explaining requirement data according to some embodiments of the present disclosure.

Referring to FIGS. 3A through 4, requirement data RD may include solution type information STI and priority information PI. However, the embodiments of the present disclosure are not limited thereto, and the priority information PI may be omitted from the requirement data RD.

Solution type information STI may refer to information related to the type of solution the user wishes to receive. For example, solution type information STI may include construction site hazard notifications, urban heatwave warning management, wildfire risk monitoring, agricultural field condition monitoring, and the like. In other words, solution type information STI may include the user's selection of any one of construction site hazard notifications, urban heatwave warning management, wildfire risk monitoring, or agricultural field condition monitoring. However, the embodiments of the present disclosure are not limited to these examples.

Priority information PI may include information related to the priority of multiple spatial information parameters SIPA for spatial information data SID. Specifically, priority information PI may include the user's selection of spatial information parameters SIPA to prioritize among a plurality of spatial information parameters. In other words, priority information PI may include the user's selection of at least one of resolution SIPA1, acquisition cost SIPA2, coverage area SIPA3, and real-time capability SIPA4.

Referring again to FIGS. 1 and 2, the data collection module 310 may transmit the received spatial information data SID and requirement data RD to other components within the device 300. For example, the data collection module 310 may transmit the spatial information data SID and requirement data RD to the selection module 320, etc.; however, the present disclosure is not limited to this arrangement. Various communication modules may be used in the data collection module 310, enabling data exchange between the user terminal 100, the external database 200, and the device 300 through the communication network 400.

The selection module 320 may select needed data ND based on the spatial information data SID and requirement data RD.

In some examples, the selection module 320 may select needed data ND required for generating the requirement data RD from among the plurality of spatial information data SID. In other words, needed data ND may include data selected from among the plurality of spatial information data SID as necessary for generating the requirement data RD.

For example, the selection module 320 may select at least one of the plurality of spatial information data SID based on the solution type information STI and priority information PI included in the requirement data RD.

The fusion module 330 may generate the spatial information convergence solution SICS by fusing the needed data ND. For example, the fusion module 330 may generate the spatial information convergence solution SICS by combining the needed data ND according to a predefined method.

The output module 340 may provide the generated spatial information convergence solution SICS to the user terminal 100. In other words, the output module 340 may transmit the spatial information convergence solution SICS generated by the fusion module 330 to the user terminal 100.

Hereinafter, the process of selecting needed data ND by the selection module 320 according to solution type information STI and priority information PI, as well as the process of generating the spatial information convergence solution SICS by the fusion module 330, will be described with reference to FIGS. 5A through 8B.

Figure 5A:
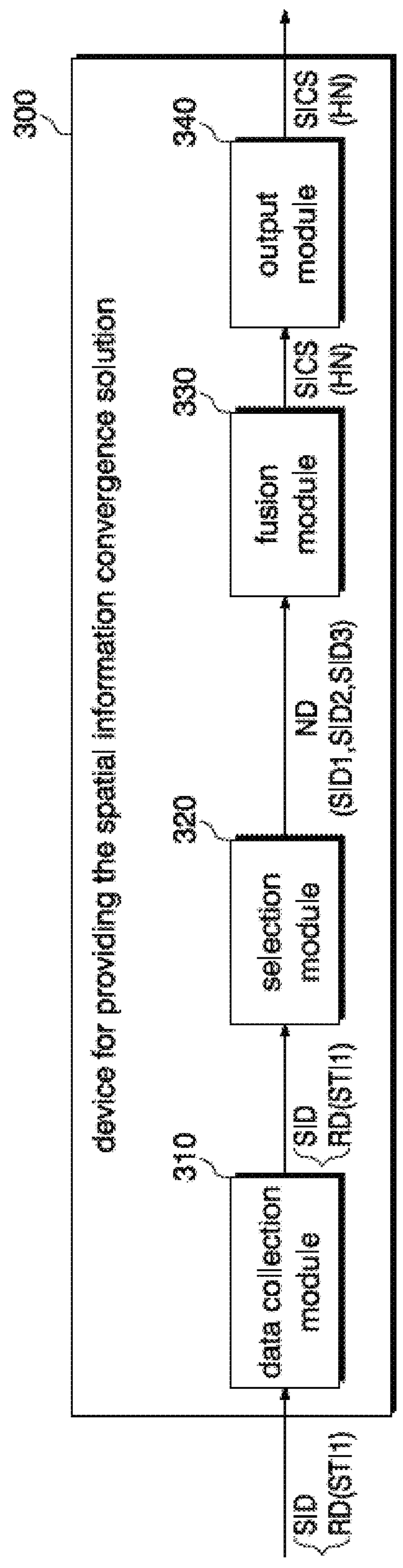
FIG. 5A illustrates the case where the solution type information is a construction site hazard notification without any priority information set.
Figure 5B:
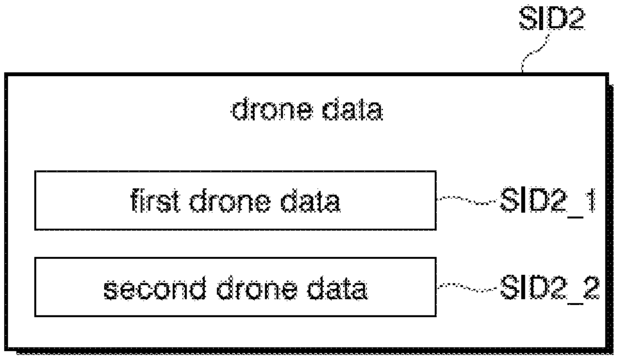
FIG. 5B illustrates the case where the solution type information is a construction site hazard notification with priority information set.

FIGS. 5A and 5B are diagrams illustrating the process of providing a spatial information convergence solution when the solution type information is a construction site hazard notification. Specifically, FIG. 5A illustrates the case where the solution type information is a construction site hazard notification without any priority information set, while FIG. 5B illustrates the case where the solution type information is a construction site hazard notification with priority information set.

Referring to FIGS. 3A through 3C, FIG. 4, and FIG. 5A, when the solution type information STI included in the requirement data RD is a construction site hazard notification STI1, the fusion module 330 may generate a hazard notification HN as the spatial information convergence solution SICS, and the output module 340 may output the generated hazard notification HN.

Specifically, when the solution type information STI is a construction site hazard notification STI1, the selection module 320 may select CCTV data SID1, drone data SID2, and GPS data SID3 as needed data ND from among the plurality of spatial information data SID1 through SID5. In other words, if the type of solution requested by the user is a construction site hazard notification STI1, the selection module 320 may select CCTV data SID1, drone data SID2, and GPS data SID3 from among the plurality of spatial information data SID1 through SID5 and designate them as the needed data ND.

Subsequently, the fusion module 330 may generate a hazard notification HN based on the CCTV data SID1, drone data SID2, and GPS data SID3 selected as the needed data ND.

In more detail, first, the fusion module 330 may determine a hazardous area within a predefined zone (construction site area) based on the drone data SID2. For example, the fusion module 330 may use a predefined object recognition algorithm to identify hazardous objects within the drone data SID2 and then determine the area at a certain distance from the identified hazardous object as the hazardous area. In this context, hazardous objects may include tower cranes, rebar, pits, and so on, while the object recognition algorithm may be a pre-trained algorithm designed to recognize hazardous objects within the drone data SID2 when the drone data SID2 is input. For instance, the object recognition algorithm may be based on algorithms such as the Single Shot MultiBox Detector (SSD) algorithm or the You Only Look Once (YOLO) algorithm; however, the embodiments of the present disclosure are not limited thereto. Subsequently, the fusion module 330 may generate a hazard notification HN if a worker in the construction site area, as determined by the CCTV data SID1 and GPS data SID3, enters the hazardous area. For example, if the fusion module 330 confirms through CCTV data SID1 that a worker has entered the hazardous area and, additionally, the GPS data SID3 from each worker's user terminal 100 in FIG. 1 is located within the hazardous area, it may generate a hazard notification HN.

Subsequently, the output module 340 may output the generated hazard notification HN on the user terminal 100 of the corresponding worker.

Meanwhile, referring to FIGS. 3A through 3C, FIG. 4, FIG. 5A, and FIG. 5B, if the solution type information STI included in the requirement data RD is a construction site hazard notification STI1 and the priority information PI is acquisition cost SIPA2, the selection module 320 may select one of the drone data SID2.

Specifically, drone data SID2 may include first drone data SID2_1 captured with a first capture interval and second drone data SID2_2 captured with a second capture interval longer than the first capture interval.

In this case, if the priority information PI is acquisition cost SIPA2, the selection module 320 may select the second drone data SID2_2 with the longer capture interval among the first drone data SID2_1 and second drone data SID2_2 when selecting the drone data SID2 as the needed data ND.

In other words, when the user prioritizes acquisition cost SIPA2, it suggests that the user prefers to receive the spatial information convergence solution SICS at a lower cost. By using the second drone data SID2_2, which is captured at a longer interval, the generation cost of the spatial information convergence solution SICS may be reduced, thereby better meeting the user's needs.

Figure 6A:
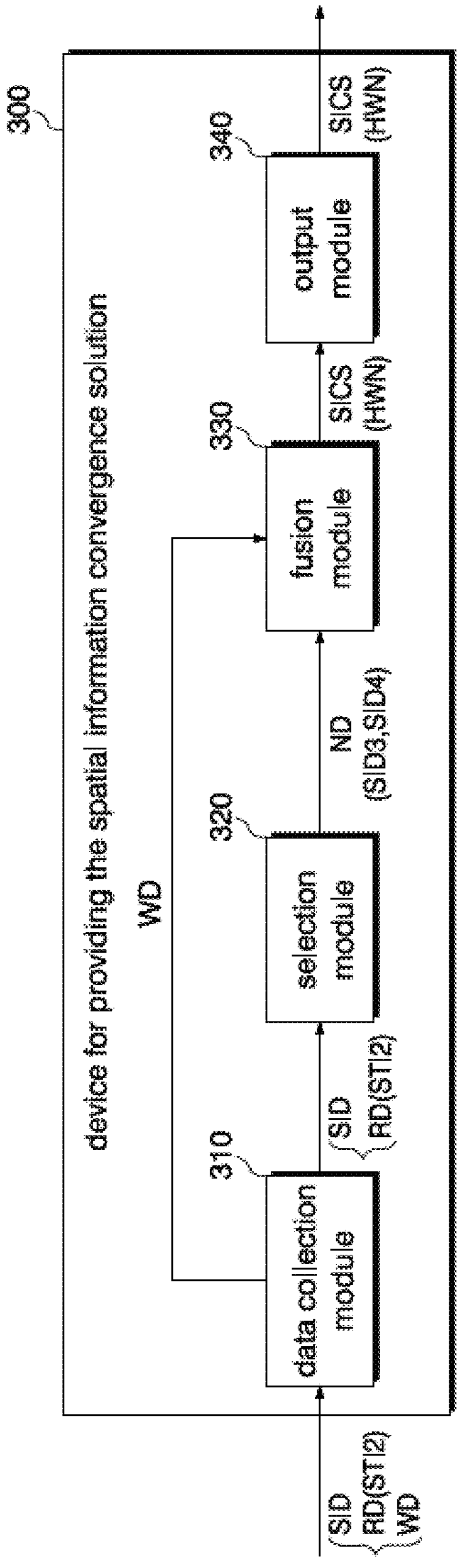
FIG. 6A illustrates the case where the solution type information is urban heatwave warning management without any priority information set.
Figure 6B:
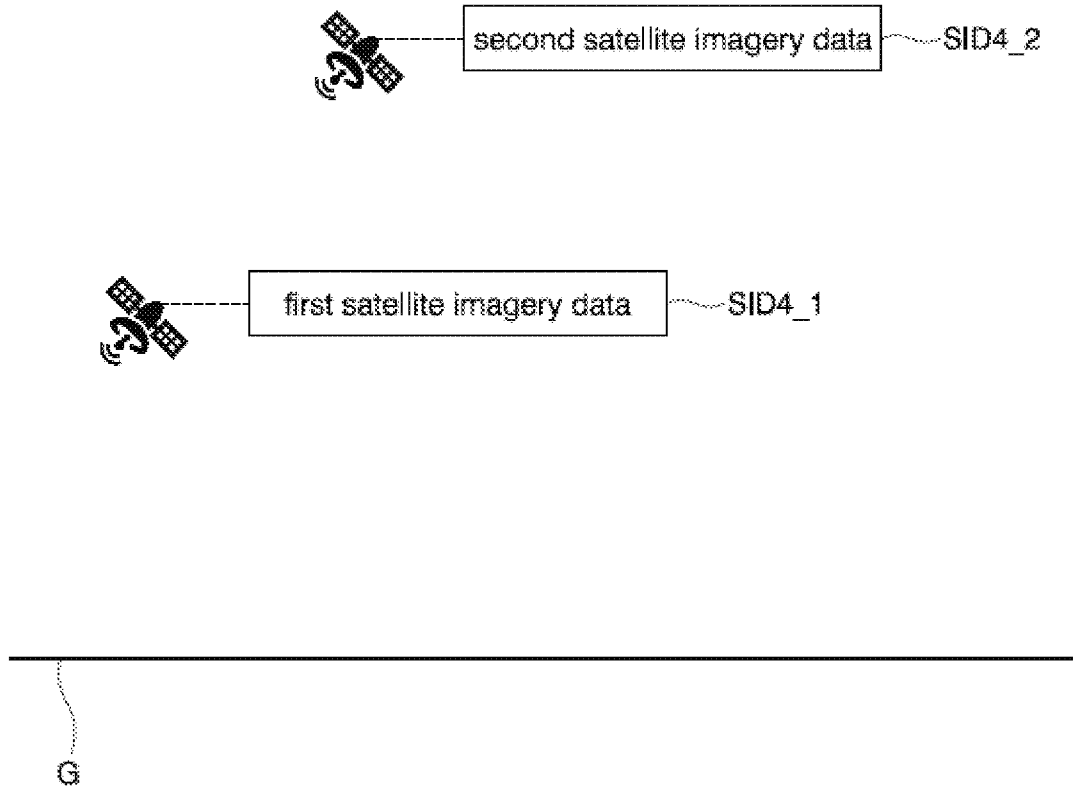
FIG. 6B illustrates the case where the solution type information is urban heatwave warning management with priority information set.

FIGS. 6A and 6B are diagrams illustrating the process of providing a spatial information convergence solution when the solution type information is urban heatwave warning management. Specifically, FIG. 6A illustrates the case where the solution type information is urban heatwave warning management without any priority information set, while FIG. 6B illustrates the case where the solution type information is urban heatwave warning management with priority information set.

Referring to FIGS. 3A through 3C, FIG. 4, and FIG. 6A, when the solution type information STI included in the requirement data RD is urban heatwave warning management STI2, the fusion module 330 may generate a heatwave notification HWN as the spatial information convergence solution SICS, and the output module 340 may output the generated heatwave notification HWN.

Specifically, when the solution type information STI is urban heatwave warning management STI2, the data collection module 310 may additionally receive weather data WD along with the aforementioned spatial information data SID and requirement data RD. In this case, the weather data WD may include temperature and humidity information. For example, the data collection module 310 may receive the weather data WD from a meteorological database (not shown), however, the embodiments of the present disclosure are not limited thereto.

Subsequently, when the solution type information STI is urban heatwave warning management STI2, the selection module 320 may select GPS data SID3 and satellite imagery data SID4 as the needed data ND from among the plurality of spatial information data SID1 through SID5. In other words, if the type of solution requested by the user is urban heatwave warning management STI2, the selection module 320 may select GPS data SID3 and satellite imagery data SID4 from among the plurality of spatial information data SID1 through SID5 and designate them as the needed data ND.

Subsequently, the fusion module 330 may generate a heatwave notification HWN based on the weather data WD and the GPS data SID3 and satellite imagery data SID4 selected as the needed data ND.

In more detail, the fusion module 330 may determine the perceived temperature at specific locations within a predefined area based on the weather data WD, GPS data SID3, and satellite imagery data SID4. In this case, the predefined area may be the area where pedestrians, identified through GPS data SID3, are located. For example, the fusion module 330 may extract the surface temperature of the predefined area from the satellite imagery data SID4 and, by inputting the extracted surface temperature, along with the temperature and humidity information included in the weather data WD, into a predefined perceived temperature determination algorithm, it may determine the perceived temperature at each location. This perceived temperature determination algorithm may be pre-trained to output perceived temperature based on inputs of surface temperature, temperature information, and humidity information. The perceived temperature determination algorithm may use the surface temperature, temperature information, and humidity information inputs to calculate and combine heat indices such as the Heat Index, Wet Bulb Globe Temperature (WBGT), and Universal Thermal Climate Index (UTCI) to output perceived temperature. Subsequently, the fusion module 330 may generate a heatwave notification HWN for pedestrians on the road. This heatwave notification HWN may include notifications for anticipated heatwave zones and potential shelter areas. For instance, the fusion module 330 may determine that the area with the highest perceived temperature at specific locations is the anticipated heatwave zone, while the area with the lowest perceived temperature is the potential shelter area (e.g., trees, shaded areas, lakes), and then generate a notification of the anticipated heatwave zone and potential shelter area as the heatwave notification HWN.

Subsequently, the output module 340 may output the generated heatwave notification HWN on the user terminal 100 of the corresponding pedestrian.

Meanwhile, referring to FIGS. 3A through 3C, FIG. 4, FIG. 6A, and FIG. 6B, if the solution type information STI included in the requirement data RD is urban heatwave warning management STI2 and the priority information PI is resolution SIPA1, the selection module 320 may select one of the satellite imagery data SID4.

Specifically, satellite imagery data SID4 may include first satellite imagery data SID4_1, which has a higher resolution and is captured from a low-orbit satellite positioned in a lower orbit relative to the ground G, and second satellite imagery data SID4_2, which has a lower resolution and is captured from a geostationary satellite positioned in a higher orbit relative to the ground G. In this case, if the priority information PI is resolution SIPA1, when selecting the satellite imagery data SID4 as the needed data ND, the selection module 320 may select the first satellite imagery data SID4_1 with higher resolution among the first satellite imagery data SID4_1 and second satellite imagery data SID4_2.

In other words, when the user prioritizes resolution SIPA1, the user wishes to receive a spatial information convergence solution SICS with higher resolution, and therefore, by using the first satellite imagery data SID4_1, which is captured at a higher resolution, the resolution of the spatial information convergence solution SICS may be improved, thereby better fulfilling the user's needs.

Figure 7A:
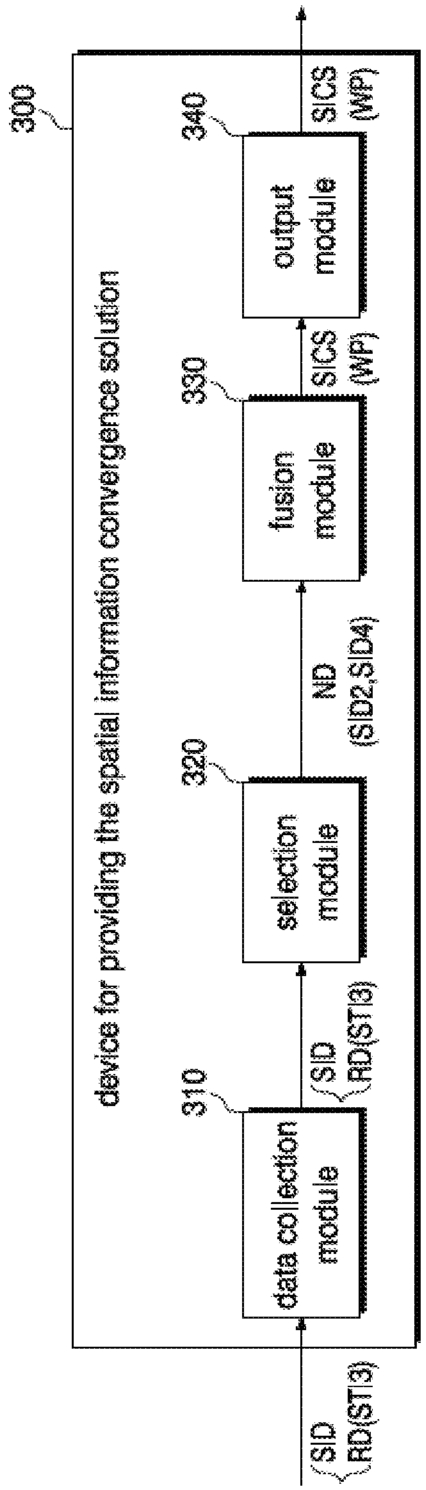
FIG. 7A illustrates the case where the solution type information is urban heatwave warning management without any priority information set.
Figure 7B:
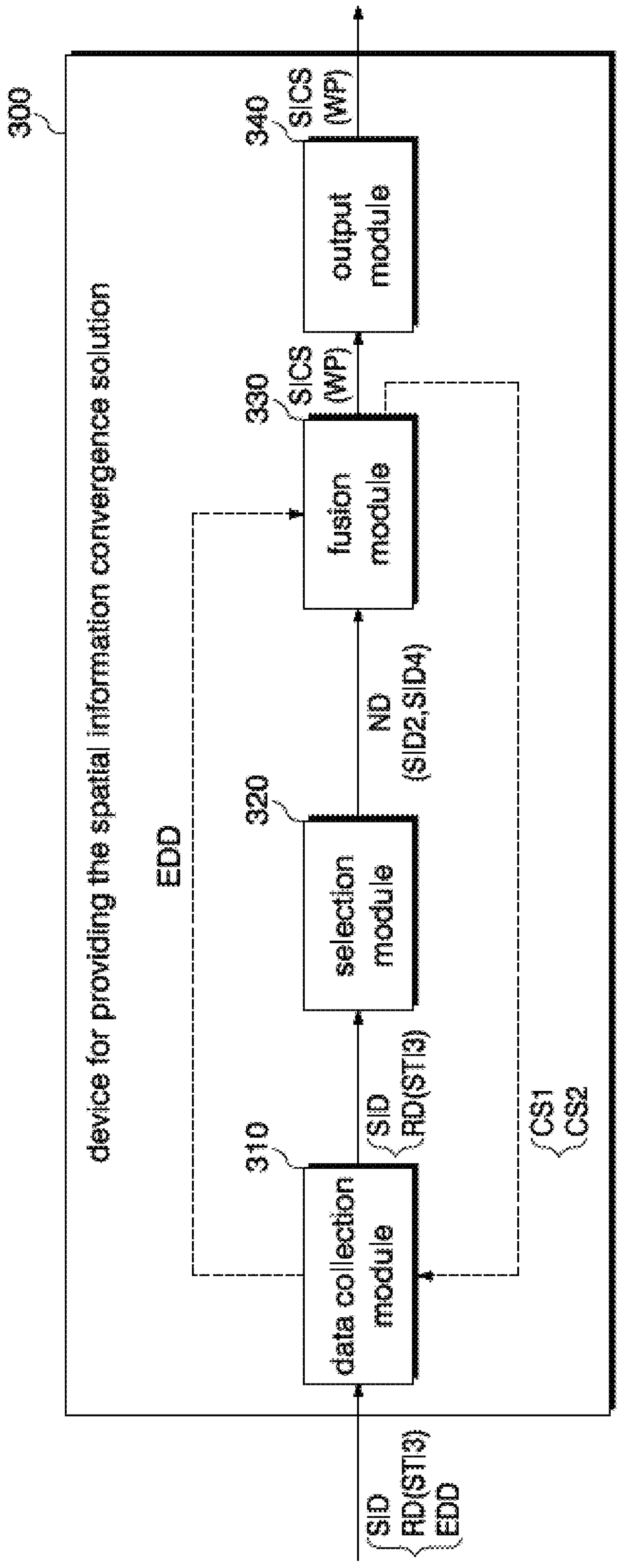
FIG. 7B illustrates the case where the solution type information is urban heatwave warning management with priority information set.

FIGS. 7A and 7B are diagrams illustrating the process of providing a spatial information convergence solution when the solution type information is wildfire risk monitoring. Specifically, FIG. 7A illustrates the case where the solution type information is wildfire risk monitoring without any priority information set, while FIG. 7B illustrates the case where the solution type information is wildfire risk monitoring with priority information set.

Referring to FIGS. 3A through 3C, FIG. 4, and FIG. 7A, when the solution type information STI included in the requirement data RD is wildfire risk monitoring STI3, the fusion module 330 may generate a wildfire parameter WP as the spatial information convergence solution SICS, and the output module 340 may output the generated wildfire parameter WP.

Specifically, when the solution type information STI is wildfire risk monitoring STI3, the selection module 320 may select drone data SID2 and satellite imagery data SID4 as the needed data ND from among the plurality of spatial information data SID1 through SID5. In other words, if the type of solution requested by the user is wildfire risk monitoring STI3, the selection module 320 may choose drone data SID2 and satellite imagery data SID4 from among the plurality of spatial information data SID1 through SID5 and designate them as the needed data ND.

Subsequently, the fusion module 330 may generate the wildfire parameter WP based on the drone data SID2 and satellite imagery data SID4 selected as the needed data ND.

In more detail, the fusion module 330 may generate the wildfire parameter WP by inputting the drone data SID2 and satellite imagery data SID4 into a pre-trained wildfire management algorithm. The wildfire parameter WP may include metrics such as wildfire-affected area and wildfire spread rate, and the wildfire management algorithm may be pre-trained to output the wildfire parameter WP by combining the drone data SID2 and satellite imagery data SID4 when they are input. For example, the wildfire management algorithm may include algorithms based on systems such as FireNet, DeepFire, ForestNet, or the Wildfire Detection and Prediction System using CNNs (WDPS-CNN); however, the embodiments of the present disclosure are not limited to these examples.

Subsequently, the output module 340 may output the generated wildfire parameter WP on the user terminal 100 of the wildfire manager in FIG. 1.

Meanwhile, referring to FIGS. 3A through 3C, FIG. 4, FIG. 7A, and FIG. 7B, if the solution type information STI included in the requirement data RD is wildfire risk monitoring STI3 and the priority information PI is real-time capability SIPA4, the data collection module 310 may additionally receive early detection data EDD along with the aforementioned spatial information data SID and requirement data RD. In this case, early detection data EDD may include smoke data and sound data. The smoke data may contain data regarding the quantity of smoke generated by a wildfire and may be acquired by smoke sensors installed in areas expected to experience wildfires. The sound data may include data detecting sounds caused by a wildfire, which may be captured by sound sensors installed in these anticipated wildfire areas. The data collection module 310 may receive smoke data and sound data from the smoke and sound sensors, respectively.

Subsequently, the data collection module 310 may transmit the received early detection data EDD to the fusion module 330.

Subsequently, the fusion module 330 may transmit a control signal CS to the data collection module 310 regarding whether to proceed with determining the wildfire parameter WP based on the received early detection data EDD.

For example, the fusion module 330 may determine a wildfire probability index based on the early detection data EDD. If the determined wildfire probability index exceeds a predefined threshold, the fusion module 330 may send a first control signal CS1 to the data collection module 310, instructing it to generate the wildfire parameter WP. Conversely, if the determined wildfire probability index is below the predefined threshold, the fusion module 330 may send a second control signal CS2 to the data collection module 310, instructing it not to generate the wildfire parameter WP. In this process, the fusion module 330 may extract features from the smoke data and sound data, combining each of the extracted features to determine the wildfire probability index. For instance, the fusion module 330 may extract smoke concentration and smoke color from the smoke data and extract amplitude within a predefined frequency range (e.g., 500 Hz to 2,000 Hz) from the sound data, associated with wildfire occurrence. In this case, the fusion module 330 may then input the extracted smoke concentration, smoke color, and amplitude in the specified frequency range into a pre-trained early detection algorithm to output the wildfire probability index. This early detection algorithm may be pre-trained to output the wildfire probability index when features such as smoke concentration, smoke color, and amplitude in the specific frequency range are input. For example, the early detection algorithm may include algorithms based on models such as FireDetectNet and WildFirePredictor, although the embodiments of the present disclosure are not limited to these examples.

Subsequently, if the data collection module 310 receives the first control signal CS1, it may transmit the spatial information data SID and requirement data RD to the selection module 320 to allow the wildfire parameter WP to be generated as the spatial information convergence solution SICS. Conversely, if the data collection module 310 receives the second control signal CS2, it may withhold transmission of the spatial information data SID and requirement data RD to the selection module 320, thereby preventing the generation of the spatial information convergence solution SICS.

In other words, when the user prioritizes real-time capability SIPA4, the wildfire probability is assessed at very short intervals. In this case, using drone data SID2 and satellite imagery data SID4 each time could result in excessive costs and potential inaccuracies. Therefore, by performing early detection using early detection data EDD, this approach achieves the new effect of preventing server overload and reducing costs.

Figure 8A:
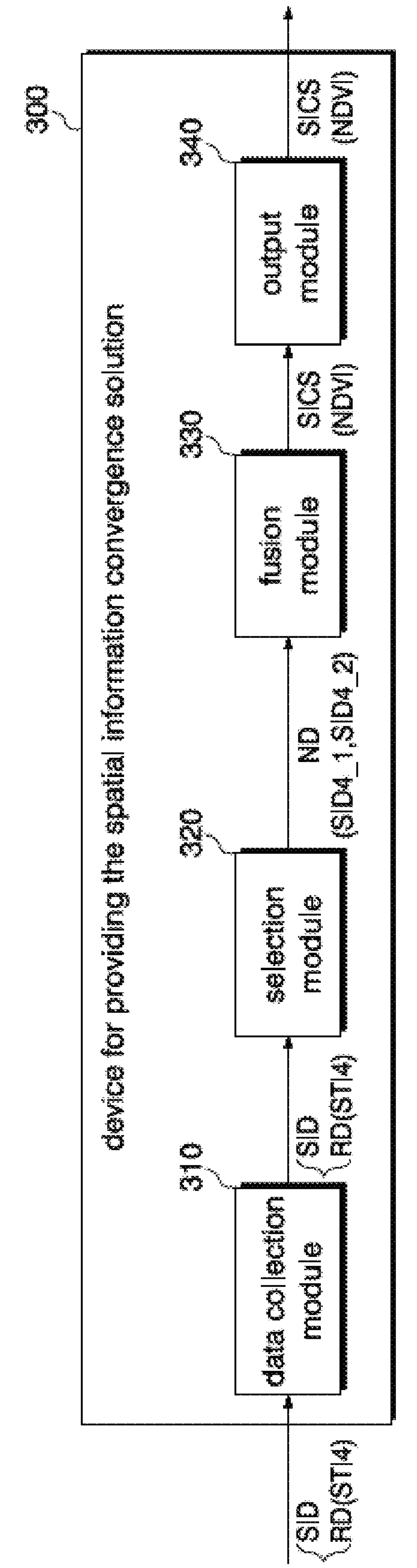
FIG. 8A illustrates the case where the solution type information is agricultural field condition monitoring without any priority information set.
Figure 8B:
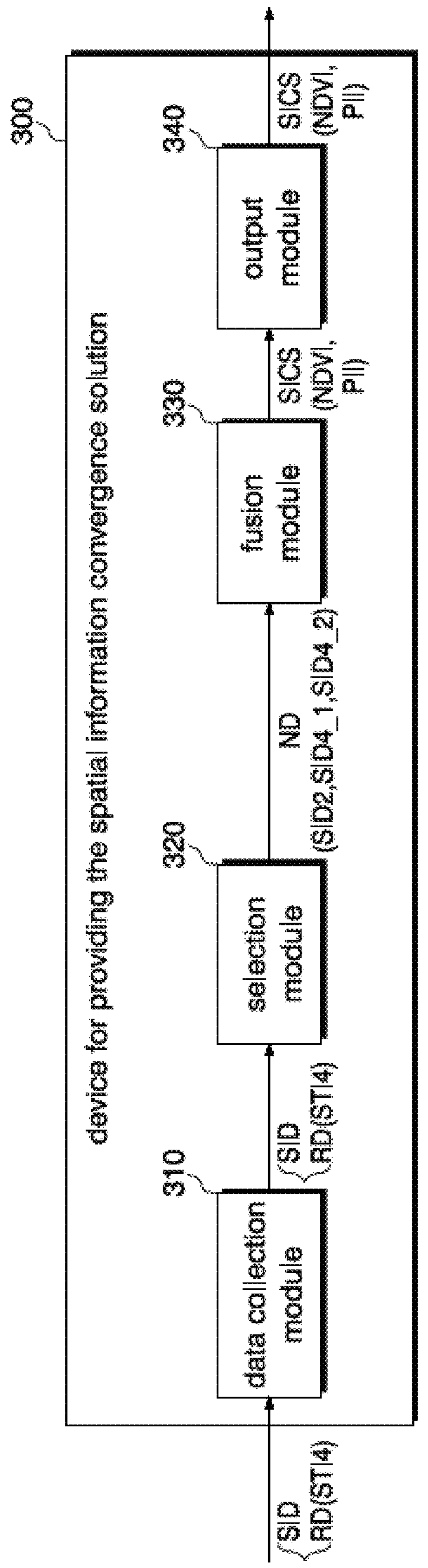
FIG. 8B illustrates the case where the solution type information is agricultural field condition monitoring with priority information set.

FIGS. 8A and 8B are diagrams illustrating the process of providing a spatial information convergence solution when the solution type information is agricultural field condition monitoring. Specifically, FIG. 8A illustrates the case where the solution type information is agricultural field condition monitoring without any priority information set, while FIG. 8B illustrates the case where the solution type information is agricultural field condition monitoring with priority information set.

Referring to FIGS. 3A through 3C, FIG. 4, and FIG. 8A, when the solution type information STI included in the requirement data RD is agricultural field condition monitoring STI4, the fusion module 330 may generate a Normalized Difference Vegetation Index, hereinafter referred to as NDVI, as the spatial information convergence solution SICS, and the output module 340 may output the generated Normalized Difference Vegetation Index NDVI.

Specifically, when the solution type information STI is agricultural field condition monitoring STI4, the selection module 320 may select the first satellite imagery data SID4_1 and the second satellite imagery data SID4_2 as the needed data ND from among the plurality of spatial information data SID1 through SID5. In other words, if the type of solution requested by the user is agricultural field condition monitoring STI4, the selection module 320 may choose the first satellite imagery data SID4_1 and the second satellite imagery data SID4_2 from among the plurality of spatial information data SID1 through SID5 and designate them as the needed data ND.

Subsequently, the fusion module 330 may generate the Normalized Difference Vegetation Index NDVI based on the first satellite imagery data SID4_1 and the second satellite imagery data SID4_2 selected as the needed data ND. For example, the fusion module 330 may generate the NDVI by combining the first satellite imagery data SID4_1 and the second satellite imagery data SID4_2.

In more detail, the fusion module 330 may perform image matching to adjust the temporal and spatial differences between the first satellite imagery data SID4_1 and the second satellite imagery data SID4_2. After this adjustment, the fusion module 330 may generate the Normalized Difference Vegetation Index NDVI based on a predefined relational formula. An example of this predefined relational formula is shown below as [Mathematical Formula 1].

$$NDVI = \frac{NIR-\text{Red}}{NIR+\text{Red}} \quad \text{[Mathematical Formula 1]}$$

In [Mathematical Formula 1] mentioned above, NDVI represents the Normalized Difference Vegetation Index, NIR represents the near-infrared band value, and RED represents the red band value included in the visible band.

Subsequently, the output module 340 may output the generated Normalized Difference Vegetation Index NDVI on the user terminal 100 in FIG. 1 of the manager responsible for the agricultural field.

Meanwhile, referring to FIGS. 3A through 3C, FIG. 4, FIG. 8A, and FIG. 8B, if the solution type information STI included in the requirement data RD is agricultural field condition monitoring STI4 and the priority information PI is resolution SIPA1, the selection module 320 may additionally select drone data SID2 in addition to the aforementioned first satellite imagery data SID4_1 and second satellite imagery data SID4_2.

Subsequently, the fusion module 330 may determine the Normalized Difference Vegetation Index NDVI based on the process described above, and determine that areas with a Normalized Difference Vegetation Index NDVI below a predefined threshold are poor-quality regions. In this case, for these poor-quality regions, the fusion module 330 may determine a Pest Infestation Index, hereinafter referred to as PII, using drone data SID2 captured for the regions. In this process, the fusion module 330 may input the drone data SID2 into a pre-trained discoloration detection algorithm to determine the Pest Infestation Index PII. The discoloration detection algorithm may be pre-trained to identify patterns indicative of damage from pests or similar factors based on the drone data SID2 when the drone data SID2 is input, and to determine the Pest Infestation Index PII based on the quantified extent of the detected patterns. For example, the discoloration detection algorithm may be based on algorithms such as PlantCV, LeafNet, or PestID; however, the embodiments of the present disclosure are not limited to these examples.

Subsequently, the fusion module 330 may generate the NDVI and the PII for poor-quality regions as the spatial information convergence solution SICS, and the output module 340 may output the Normalized Difference Vegetation Index NDVI and Pest Infestation Index PII on the user terminal 100 in FIG. 1 of the manager responsible for the agricultural field.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A device for providing a spatial information convergence solution comprising:

a data collection module configured to receive a plurality of spatial information data and user requirement data;

a selection module configured to select needed data required for generating the requirement data from among the plurality of spatial information data;

a fusion module configured to generate a spatial information convergence solution by fusing the needed data; and an output module configured to provide the spatial information convergence solution to a user terminal for the user, wherein the plurality of spatial information data comprises at least one of CCTV data, drone data, GPS data, satellite imagery data, and aerial data.

2. The device of claim 1, wherein the satellite imagery data comprises first satellite imagery data captured by a low-orbit satellite and second satellite imagery data captured by a geostationary satellite.

3. The device of claim 2, wherein the requirement data comprises solution type information related to the type of solution to be provided and priority information related to the priority of spatial information parameters.

4. The device of claim 3, wherein the solution type information comprises any one of construction site hazard notifications, urban heatwave warning management, wildfire risk monitoring, and agricultural field condition monitoring.

5. The device of claim 4, wherein the spatial information parameters comprise at least one of resolution, acquisition cost, coverage area, and real-time capability, and the priority information comprises the user's selection of at least one of the plurality of spatial information parameters.

6. The device of claim 5, wherein, when the solution type information is the construction site hazard notification, the selection module selects the CCTV data, drone data, and GPS data as the needed data, the fusion module determines a hazardous area within a predefined zone based on the drone data and generates a hazard notification as the spatial information convergence solution when a worker enters the hazardous area, based on the CCTV data and GPS data, and the output module provides the hazard notification to the user terminal corresponding to the worker.

7. The device of claim 6, wherein, when the priority information is the acquisition cost, the selection module selects a second drone data as the needed data from among a first drone data captured with a first capture interval and the second drone data captured with a second capture interval longer than the first capture interval.

8. The device of claim 5, wherein, when the solution type information is the urban heatwave warning management, the data collection module further receives weather data including temperature and humidity information, the selection module selects the satellite imagery data and GPS data as the needed data, the fusion module determines the perceived temperature at specific locations within a predefined area based on the weather data and satellite imagery data, and generates a heatwave notification to a pedestrian as the spatial information convergence solution based on the location-specific perceived temperature and the GPS data, and the output module provides the heatwave notification to the user terminal corresponding to the pedestrian, wherein the heatwave notification comprises at least one of a notification regarding anticipated heatwave zones and a notification regarding potential shelter areas.

9. The device of claim 5, wherein, when the solution type information is the wildfire risk monitoring, the selection module selects the drone data and satellite imagery data as the needed data, the fusion module generates a wildfire parameter by inputting the drone data and satellite imagery data into a pre-trained wildfire management algorithm, and determines the generated wildfire parameter as the spatial information convergence solution, and the output module provides the wildfire parameter to the user terminal, wherein the wildfire parameter comprises at least one of wildfire-affected area and wildfire spread rate.

10. The device of claim 5, wherein, when the solution type information is the agricultural field condition monitoring, the selection module selects the first satellite imagery data and the second satellite imagery data as the needed data, the fusion module determines a Normalized Difference Vegetation Index NDVI by combining the first satellite imagery data and the second satellite imagery data, and determines the determined Normalized Difference Vegetation Index NDVI as the spatial information convergence solution, and the output module provides the Normalized Difference Vegetation Index NDVI to the user terminal.

* * * * *